UNITED STATES PATENT OFFICE.

ROBERT DODD AND HERBERT BROOKE PERREN HUMPHRIES, OF LONDON, ENGLAND.

PREPARATION OF SEMIPLASTIC MATERIAL FROM THE SOJA BEAN.

1,143,893. Specification of Letters Patent. Patented June 22, 1915.

No Drawing. Application filed June 26, 1914. Serial No. 847,493.

*To all whom it may concern:*

Be it known that we, ROBERT DODD and HERBERT BROOKE PERREN HUMPHRIES, subjects of the King of Great Britain and Ireland, residing at London, England, have invented new and useful Improvements in the Preparation of Semiplastic Material from the Soja Bean, of which the following is a specification.

This invention has relation to the preparation or production of semi-plastic material from the proteins or protein containing materials of the soja bean and closely resembling ivory, vegetable ivory or corozo nut, horn and the like.

It has long been a custom in China, Japan and other countries in the Far East to prepare crude cakes from the soja bean. These cakes have some strength and hardness but they are not commercially satisfactory either as regards strength or workability. The process of preparation adopted in the manufacture of these crude cakes has consisted in macerating the beans in water, then adding sea water to the cream or emulsion so obtained so as to coagulate it and finally drying and weathering the coagulate.

The present invention has for object to provide a process of preparation of semi-plastic material from the soja bean, which material shall possess advantages not possessed by the material produced by the process set forth in the preceding paragraph, and in addition shall possess the power of taking a high polish, and also other advantages.

The soja bean contains, in addition to proteid containing material, oil and non-proteid containing material, and a proportion of the oil and non-proteid containing material can, in some cases, advantageously be incorporated in the finished product, the utility and properties of which, however, depend to a large extent upon the methods and conditions of the coagulation of the proteins.

In the process of preparing semi-plastic material from the soja bean in accordance with this invention, the beans are first subjected to treatment which removes the whole or a portion of the oil therefrom; the treated beans are then macerated with a solvent such as water, or an aqueous solution of an alkali or salt capable of dissolving proteid matter, in order that the soluble and emulsifiable portions thereof may be correspondingly acted upon; the whole or a portion of the unemulsifiable and insoluble matters are then separated from the solution or emulsion of the protein and soluble matters, and the solution, emulsion or suspension so obtained is subjected, either in the cold or at a raised temperature, to the action of a suitable coagulant; finally the coagulate so produced is separated and subjected to well known processes, for example, it is placed in molds and subjected to pressure.

The coagulation may be effected in the presence of formalin, and the coagulant employed may be any salt, acid or substance having the property of coagulating proteins. In some cases it is preferred to use as the coagulant, aluminium sulfate or a mixture of aluminium sulfate and an acid, such as hydrochloric acid. The maceration may, in some instances, be effected with a solution of calcium or sodium hydroxide and the emulsion, solution or suspension treated with aluminium sulfate.

Precipitation or coagulation occurs in the cold, but the action is assisted and effected more easily at a higher temperature or by raising the temperature.

The addition of formalin before or during coagulation further facilitates the complete separation of the coagulate and renders it more suitable for subsequent treatment. Also the coagulation may be effected by a small quantity of acid and the product treated at a later stage with a solution of aluminium sulfate or other salt and formalin.

The product may be colored by the addition of dye to the liquors to be coagulated or by treatment subsequently.

For certain purposes glutinous, filling, hardening mordant or other materials may be introduced at a convenient stage.

A material suitable for use in the manufacture of buttons and the like may be produced as follows:—One kilogram of soja cake or meal is macerated with water, and unemulsifiable and insoluble matter is removed from the resultant. The separated emulsion, solution or suspension is then warmed to about 50° C. and 25 grams of Columbia black and 1.3 grams of castile soap dissolved in 100 cc. of hot water are stirred thereinto. Coagulant consisting of a solution containing 100 grams of aluminium sulfate and 20 cc. of formalin is then added and as soon as coagulation is complete, the coagulate is strained off, placed in suitable molds and subjected to moderate pressure.

The cake so obtained is treated in a bath of weak formaldehyde to harden it and dried.

An alternative coagulant consists of 40 grams aluminium sulfate, 20 cc. hydrochloric acid, and 20 cc. formalin, in 250 cc. water.

What we claim is:—

1. A process for the preparation of a semi-plastic material from the soja bean consisting in macerating and extracting the oil freed bean with a solvent, separating the solution containing the soluble and emulsifiable portion from the part which is not so, subjecting the separated portion to the action of a coagulant, separating the coagulate, and molding it.

2. A process for the preparation of a semi-plastic material from the soja bean consisting in macerating and extracting the oil freed bean with a solvent, separating the solution containing the soluble and emulsifiable portion from the part which is not so, subjecting the separated portion to the action of a coagulant in the presence of formalin, separating the coagulate, and molding it.

3. A process for the preparation of a semi-plastic material from the soja bean consisting in macerating and extracting the oil freed bean with a solvent, separating the solution containing the soluble and emulsifiable portion from the part which is not so, subjecting the separated portion to the action of a coagulant consisting of aluminium sulfate, separating the coagulate, and molding it.

4. A process for the preparation of a semi-plastic material from the soja bean consisting in macerating and extracting the oil freed bean with a solvent, separating the solution containing the soluble and emulsifiable portion from the part which is not so, subjecting the separated portion to the action of a coagulant consisting of aluminium sulfate in the presence of formalin, separating the coagulate, and molding it.

5. A process for the preparation of a semi-plastic material from the soja bean consisting in macerating and extracting the oil freed bean with a solvent, separating the solution containing the soluble and emulsifiable portion from the part which is not so, subjecting the separated portion to the action of a coagulant consisting of aluminium sulfate and an acid, separating the coagulate, and molding it.

6. A process for the preparation of a semi-plastic material from the soja bean consisting in macerating and extracting the oil freed bean with a solvent, separating the solution containing the soluble and emulsifiable portion from the part which is not so, subjecting the separated portion to the action of a coagulant consisting of aluminium sulfate and an acid in the presence of formalin, separating the coagulate, and molding it.

7. Material for the manufacture of buttons and the like, consisting of the proteins of the soja bean, coagulated, colored, filled and hardened, substantially as described.

Dated this 17th day of June, 1914.

ROBERT DODD.
HERBERT BROOKE PERREN HUMPHRIES.

Witnesses:
JOHN E. RAWORTH,
W. B. PRINCE.